United States Patent [19]

Yopp

[11] Patent Number: 5,083,454
[45] Date of Patent: Jan. 28, 1992

[54] FORCE-OPERATED SUSPENSION POSITION SENSOR FOR AUTOMOTIVE VEHICLE

[75] Inventor: W. Trent Yopp, Canton, Mich.

[73] Assignee: Ford Motor Company, Dearborn, Mich.

[21] Appl. No.: 687,075

[22] Filed: Apr. 17, 1991

Related U.S. Application Data

[63] Continuation of Ser. No. 138,761, Dec. 28, 1987, abandoned.

[51] Int. Cl.[5] .......................................... G01M 15/00
[52] U.S. Cl. .................................................. 73/118.1
[58] Field of Search ............ 180/41; 73/11, 12, 118.1, 73/707, 721; 280/6 R, 6 H, 707; 340/136, 52 R

[56] References Cited

U.S. PATENT DOCUMENTS

| | | | |
|---|---|---|---|
| 2,486,133 | 10/1949 | Egger | 73/707 |
| 2,725,749 | 12/1955 | Green | 73/707 |
| 3,473,109 | 10/1969 | Maaz et al. | |
| 3,581,773 | 6/1971 | Warren | 73/707 |
| 4,105,216 | 8/1978 | Graham et al. | |
| 4,107,604 | 8/1978 | Bernier | |
| 4,204,158 | 5/1980 | Licouard et al. | |
| 4,373,397 | 2/1983 | Keller | 73/721 |
| 4,433,849 | 2/1984 | Ohmori | |
| 4,453,725 | 6/1984 | Kuwana et al. | |
| 4,458,234 | 7/1984 | Brisard | 340/52 R |
| 4,513,623 | 4/1985 | Kurtz et al. | 73/721 |
| 4,540,188 | 9/1985 | Meloche et al. | |
| 4,555,120 | 11/1985 | Frait et al. | |
| 4,564,214 | 1/1986 | Tokunaga et al. | 280/6 H |
| 4,568,096 | 4/1986 | Yew et al. | |
| 4,575,115 | 3/1986 | Takemoto et al. | 280/707 |
| 4,693,485 | 9/1987 | Kamei et al. | 280/6 R |
| 4,700,303 | 10/1987 | Tokuyama et al. | 280/707 |
| 4,776,440 | 10/1988 | Yamada et al. | 188/297 |

FOREIGN PATENT DOCUMENTS

| | | | |
|---|---|---|---|
| 1147649 | 11/1957 | France | 188/297 |
| 2093946 | 9/1982 | France | 73/11 |

OTHER PUBLICATIONS

Internal Combustion Engines, International Textbook Company, 1968, at pp. 147-153.

Primary Examiner—Robert Raevis
Attorney, Agent, or Firm—Jerome R. Drouillard; Roger L. May

[57] ABSTRACT

A sensor for determining the operational position of an automotive suspension including two suspension members relatively removable with respect to another includes an assembly with a first component movable with respect to a second component, with the first and second components being relatively movable with respect to each other as a result of the movement of the vehicle suspension. A sensor according to this invention will further include, without limitation, a force generation device associated with the sensor components for generating a force with a magnitude which is related to the position of the suspension members with respect to one another and a transducer device associated with the force generation device for producing a signal which is related to the magnitude of the force, and hence, to the position of the suspension members with respect to one another.

8 Claims, 3 Drawing Sheets

FORCE-OPERATED SUSPENSION POSITION SENSOR FOR AUTOMOTIVE VEHICLE

This is a continuation of copending application(s) Ser. No. 07/138,761 filed on Dec. 28, 1987, now abandoned.

BACKGROUND OF THE INVENTION

1. Field of the Invention

This invention relates to a force-operated suspension position sensor for an automotive vehicle.

2. Disclosure Information

Automotive suspensions employing adjustable suspension units typically utilize one or more sensors for detecting the position of one or more portions of the suspension with respect to either another part of the suspension itself or another part of the chassis of the vehicle. In the case of vehicles using load leveling or air or hydropneumatic suspension systems, it is necessary to know the ride height of the vehicle in order to determine whether correction of the ride height is required. In the event, for example, that, the ride height is lower than a prescribed "trim" limit, as determined by the height sensor, an adjustable suspension unit may be given a command to increase ride height. Conversely, in the event that the ride height exceeds the prescribed "trim" limit, the adjustable suspension unit may be given a command to lower, or decrease, the ride height.

Vehicular height sensors are useful not only with ride height adjusting systems but also as transducers for use with adjustable suspension dampers. A sensor according to the present invention is useful for providing not only suspension position information but also ride height information for use with a vehicle leveling system or an air or hydropneumatic adjustable suspension or other type of adjustable suspension system.

U.S. Pat. No. 4,105,216 discloses a motor vehicle level control circuit in which a pair of optical detectors interacts with a rotary shutter device to produce a first logic signal pair when the vehicle's ride height is in a trim region, and second and third logic signal pairs when the vehicle's ride height is either high or low and out of the trim region. The system of the '216 patent has the capability of producing only three logic signal pairs with two detector devices. A sensor according to the present invention, however, will have the capability to produce, with only a single detector or transducer device, a continuously variable output defining a great number of ride height states.

U.S. Pat. No. 4,453,725 discloses a rotary height sensor using a bifurcated shutter and three optical devices in order to produce a sensor capable of resolving vehicle ride height into five levels.

U.S. Pat. No. 4,433,849 discloses a vehicle leveling system having two reference vehicle ride height positions requiring separate detectors for each reference ride height position.

U.S. Pat. application Ser. No. 126,082, filed Nov. 27, 1987, which is assigned to the assignee of the present invention, discloses a vehicle height sensor in which two detector devices are used to produce a digital output having four discrete states.

A variety of sensing techniques have been employed with vehicular height sensors. These include, without limitation, electro-optical devices, linear variable differential transformers, and Hall Effect devices. Examples of the latter are disclosed in U.S. Pat. Nos. 3,473,109; 4,107,604; 4,204,158; and 4,555,120.

A sensor according to the present invention may be used beneficially in conjunction with an operator for controlling the ride height of an automotive vehicle. U.S. Pat. Nos. 4,105,216; 4,453,725; 4,540,188; and 4,568,096 all disclose ride height control systems which track the amount of time the system spends in a high or low position on either side of a trim band. It is also known to control suspension ride height by taking an average of the amount of time the suspension spends above or below a trim band. None of the previously described systems, however, calculates a weighted average which takes into account the magnitude of the suspension's excursion either above or below the trim band or region. Accordingly, it is an object of the present invention to provide a system which tracks and calculates a weighted average ride height so as to provide a more precise measurement of actual ride height upon which to base corrective action.

It is an object of the present invention to provide a high resolution suspension position sensor capable of accommodating a plurality of reference vehicle ride height positions with a single height sensor containing only a single detector.

It is an advantage of the present invention that a suspension position sensor according to this invention will furnish much more information than prior art sensors having a greater number of detector devices.

It is a further advantage of the present invention that a system comprising a plurality of sensors according to the present invention and used for controlling the ride height of a vehicle may be calibrated with ease during the installation of the sensors by merely placing the vehicle at a reference ride height and by placing in the memory of an electronic processor associated with the sensors a signal for each of the sensors corresponding to the reference ride height. This will automatically compensate for manufacturing differences in the sensors and in the mounting hardware of the sensors.

It is a further object of the present invention to provide an adjustable ride height suspension unit operator and sensor for controlling the ride height of an automotive vehicle which utilizes a weighted averaging technique for determining when correction of the ride height is warranted.

Other objects, features and advantages of the present invention will become apparent to those skilled in the art to which the present invention pertains.

SUMMARY OF THE INVENTION

According to the present invention, a sensor for determining the operational position of an automotive suspension including two suspension members relatively movable with respect to one another comprises an assembly including a first sensor component movable with respect to a second sensor component, means for attaching the first sensor component to one of the relatively movable suspension members and means for attaching the second sensor component to the other of the relatively movable suspension members such that the first and second sensor components will be caused to move with respect to one another when the suspension members move with respect to one another. A sensor according to this invention further comprises force generation means associated with the first and second sensor components for generating a force with a magnitude which is related to the position of the suspension members with respect to one another and transducer means associated with the force generation means for producing a signal which is related to the magnitude of the force.

The force generation means may comprise an elastically deformable member positioned between the first and second sensor components such that the deformable member will be deformed by the sensor components when the components are moved with respect to one another, with the result that the deformable member will exert a pressure upon the transducer means. The elastically deformable member may comprise a compression spring.

A transducer means used with the present invention may comprise a pressure vessel operatively connected with the force generation means such that the pressure within the vessel is proportional to the magnitude of the force generated, with the transducer means further comprising means for measuring such pressure and for producing a signal which is proportional to such pressure. Alternatively, the transducer means may comprise a piezoelectric crystal device operatively connected with the forced generation means that the crystal device produces a signal proportional to the force generated by the force generation means. The transducer means comprises part of the first sensor component, which further comprises a housing for the transducer and means for mounting the housing to one of said relatively movable suspension members.

The second sensor component comprises a plunger telescopically received in said housing, with the plunger bearing upon an elastically deformable member in contact with the force transducer means, such that the plunger and the elastically deformable member will exert a force upon the transducer means which is proportional to the position of the suspension members with respect to one another.

A sensing system according to the present invention could further comprise processor means, comprising a read only memory, for receiving a signal from the transducer means and for producing another signal which is directly proportional to the relative position of the suspension members with respect to one another.

An adjustable ride height suspension unit operator and sensor for controlling the ride height of an automotive vehicle according to the present invention comprises a high resolution height sensor, such as the illustrated force-operated sensor or a linear variable differential transformer (LVDT), or other type of high resolution sensor, for providing a train of ride height signals related to the ride height of the vehicle, and a processor comprising means for receiving ride height signals originating from the high resolution height sensor, with the processor further comprising means for calculating the weighted average of the ride height signals and means for comparing the calculated weighted average to a plurality of values corresponding to a plurality of different reference ride heights and for generating an adjustment signal having a value which is dependent upon the results of the comparison. Finally, an adjustable ride height suspension unit operator and sensor according to this invention will include adjustment means responsive to the adjustment signal generated by the processor, for changing the ride height of the automotive vehicle by adjusting an adjustable suspension unit. The processor means for comparing the weighted average to a plurality of values corresponding to a plurality of different reference ride heights and for generating an adjustment signal having a value which is dependent upon the results of the comparison may comprise a read only memory (ROM) containing a plurality of values of the weighted ride height average and corresponding values of the adjustment signal. Finally, a processor means for receiving the ride height signals and for calculating the weighted average of the signals may comprise a summing register for receiving the ride height signals from a signal conditioner operatively associated with the ride height sensor.

DETAILED DESCRIPTION OF THE PREFERRED EMBODIMENTS

Figure 1:
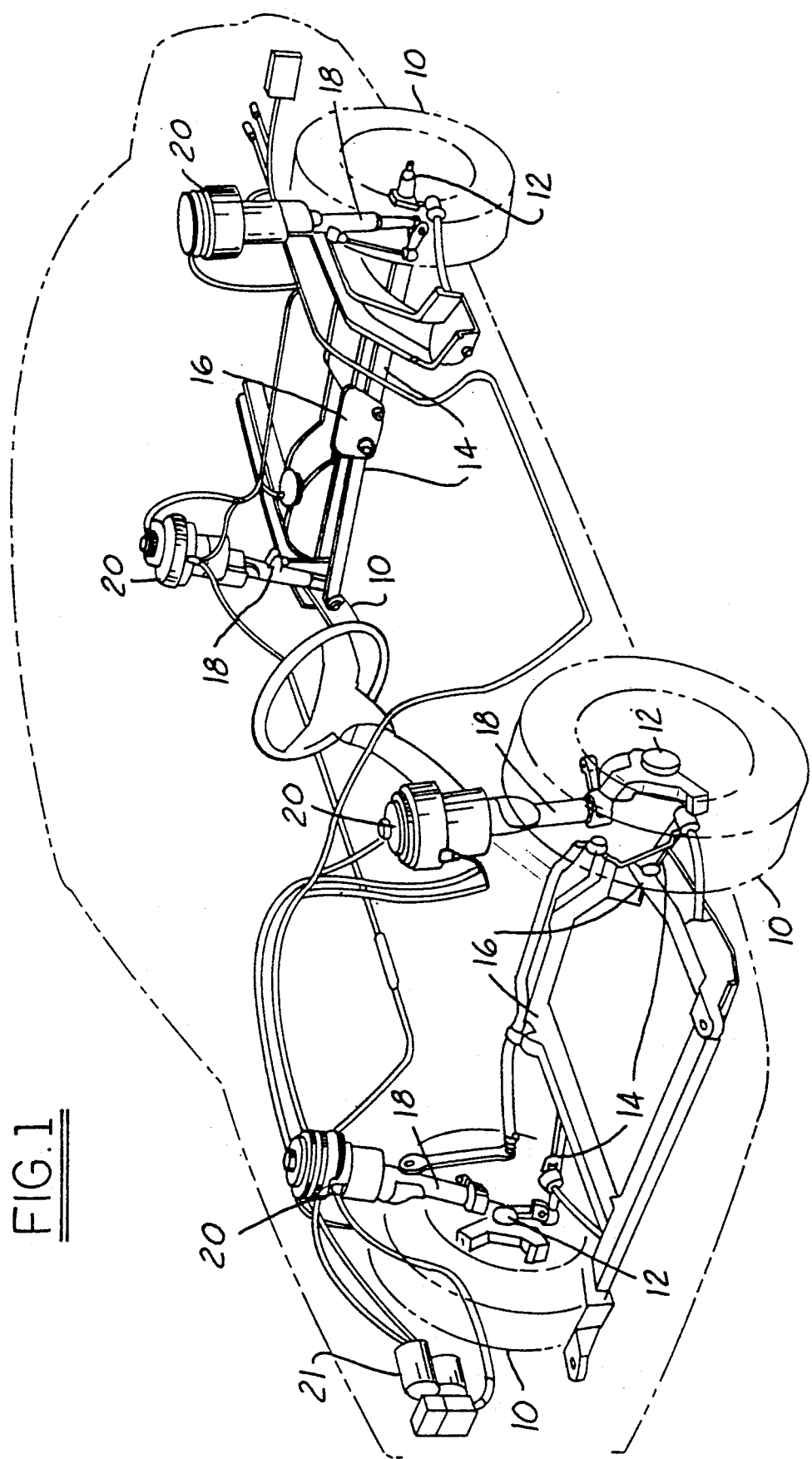
FIG. 1 is a perspective view of an automobile having adjustable suspension units which are exemplary of a class of adjustable suspension units suitable for use with a sensor and system according to the present invention.
Figure 2:
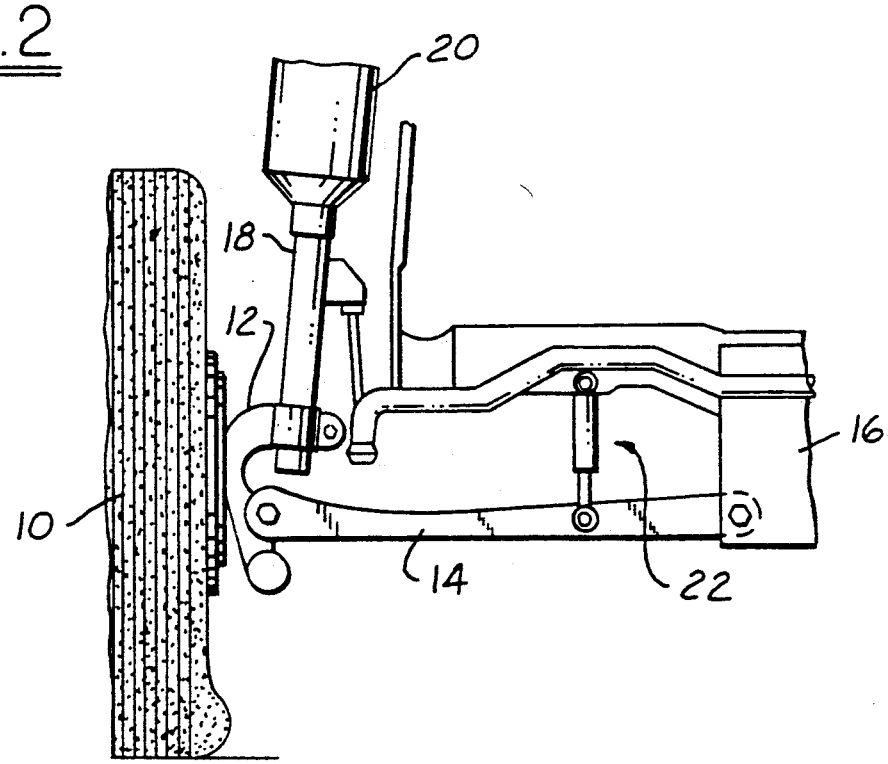
FIG. 2 is a frontal elevation of an automotive suspension equipped with a suspension position sensor according to the present invention.

As shown in FIGS. 1 and 2, a suspension position sensor according to the present invention is intended for use with an automotive suspension including road wheel and tire assembly 10, which is rotatably attached to wheel carrier 12. Each of the suspensions shown in FIGS. 1 and 2 includes a lower control arm, 14, having an inboard end pivotally attached to body or chassis 16, and an outboard end pivotally attached to wheel carrier 12. Compressor 21 provides the suspension with compressed air, which is supplied to ride height adjusters 20 in conventional fashion to permit the adjusters to increase the vehicle's ride height in the event that a "low" condition is sensed by a device and system according to the present invention. Conversely, if the vehicle's ride height is sensed by a system according to this invention as being too high, the height may be reduced by venting air from the ride height adjusters.

In addition to the elements previously enumerated, the suspension of FIGS. 1 and 2 includes adjustable MacPherson strut 18, having a lower end which is rigidly attached to wheel carrier 12, and an upper end which passes through ride height adjuster 20. The upper end of strut 18 extending above ride height adjuster 20 is resiliently or pivotally attached to the chassis of the vehicle in conventional fashion. Because chassis 16 includes means for mounting various components of the suspension systems, it is properly considered to be a part of the suspension.

The suspension of FIG. 2 is completed by position sensor 22, which serves to sense the vertical position of the road wheel with respect to the chassis. As may be seen from FIG. 2, this sensing results from the connection of position sensor 22 between chassis 16 and lower control arm 14 such that the motion of lower control arm 14 which accompanies vertical movement of the road wheel will be accompanied by linear or telescoping motion of sensor 22.

Those skilled in the art will appreciate in view of this disclosure that although the present suspension system has been described in view of the well-known MacPherson strut configuration, a height sensor and system according to the present invention could be utilized with a variety of suspension configurations including modified MacPherson strut, Hotchkiss, quadralink, parallel arm, or other types of suspension configurations. It will further be appreciated that a sensor according to the present invention could be utilized with suspension systems featuring not only controllable damping or controllable ride height, but also those systems in which both damping and ride height are controlled. Further, the sensor disclosed herein would likely be useful for providing operational data for other types of semi-active or active vehicular suspension systems, including those responding to road undulations, or other types of systems requiring suspension position or suspension velocity information.

Figure 3:
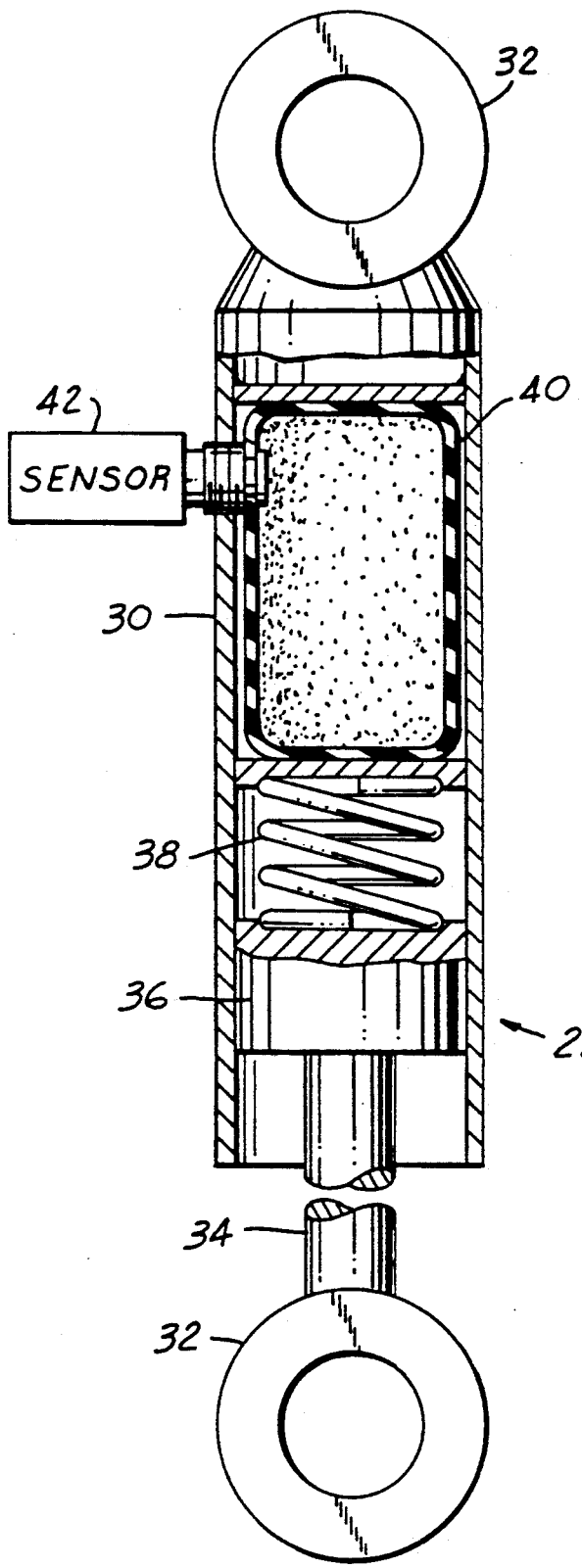
FIG. 3 is a broken away, partially schematic sectional view of a first embodiment of the sensor shown in FIG. 2.
Figure 4:
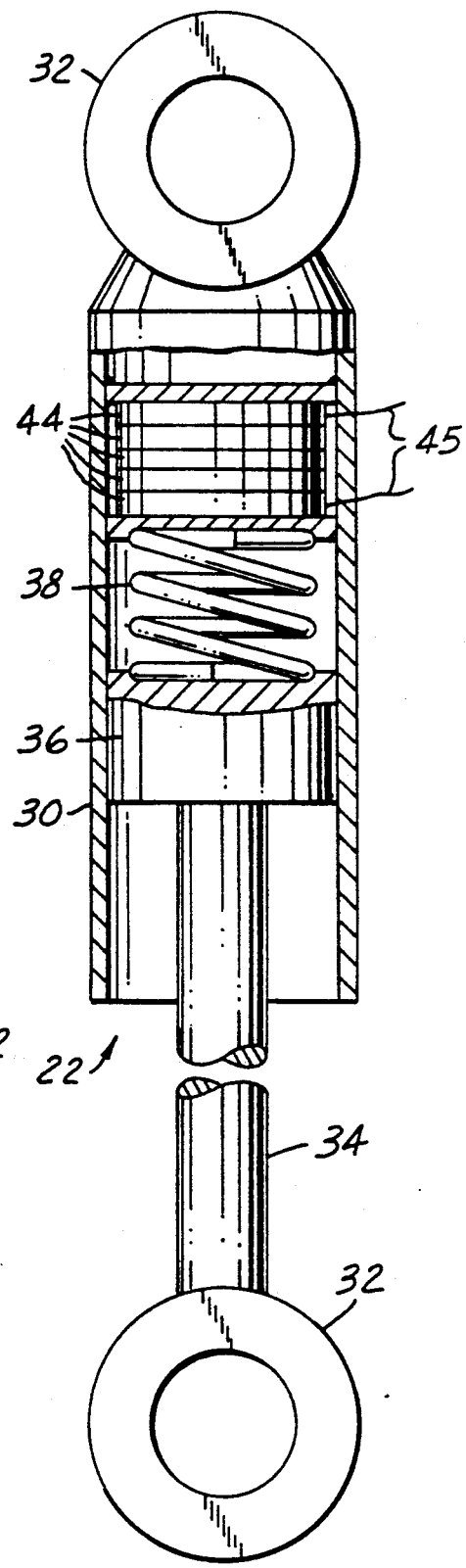
FIG. 4 is a broken away, partially schematic sectional view of a second embodiment of the sensor shown in FIG. 2.

As shown in FIGS. 3 and 4, each illustrated embodiment of height sensor 22 includes outer housing 30, having an attachment eye, 32, integral therewith. A similar attachment eye is incorporated into plunger rod 34, which is surmounted by plunger 36. The plunger and plunger rod are telescopically or slidably received by outer housing 30. The free end of plunger 36 bears upon an elastically deformable member, which is illustrated as compression spring 38. Other types of elastically deformable members such as those constructed of non-metallic elastomeric compounds could be employed in a sensor according to the present invention.

Plunger 36 bears upon compression spring 38 such that the spring will be compressed as the two halves of the sensor are moved together telescopically. As spring 38 is compressed, force will build within the spring, and this force will be exerted equally upon plunger 36 and upon the transducer means contained within housing 30. As such, the spring and plunger comprise means for generating a force with magnitude which is related to the position of the suspension members with respect to one another. Because it is possible to construct springs which are fairly linear in terms of their force/displacement constant, the force exerted by the spring will be almost directly proportional to the relative position of the two sensor components which are attached to their respective suspension members. Those skilled in the art will appreciate in view of this disclosure that a non-linear rate spring could be used in a sensor according to the present invention. Such a spring could be employed, for example, in the event that alternative stabilized ride heights are desired. For example, if it is desired to provide a stabilized ride height which is lower than the customary ride height, a non-linear spring could be used which provides greater force buildup as the ride height is decreased, so as to magnify the contribution of the lower ride height weighted average ride height calculation disclosed herein. Moreover, those skilled in the art will appreciate in view of this disclosure that the linearity or non-linearity of the spring or other elastomeric device is really of little import with a sensor and system according to the present invention, because any non-linearity is easily accommodated by the lookup table approach described herein for handling the sensor's output.

As previously explained, telescopic movement of sensor 22 accompanies vertical movement of the suspension illustrated in FIGS. 1 and 2. Accordingly, outer housing 30 and the componentry associated therewith, and plunger 36 and its associated componentry, comprise first and second components which are caused to move with respect to one another when the suspension members move with respect to one another.

Alternative transducer means are illustrated in FIGS. 3 and 4. In each case, the transducer means produces a signal which is related to the magnitude of the force exerted upon the transducer by compression spring 38. In FIG. 3, the transducer is illustrated as comprising pressure capsule 40, having an associated pressure sensor or measuring device, 42. The pressure capsule may be constructed of any suitable metallic or non-metallic material capable of withstanding forces imposed by spring 38.

As the force exerted by spring 38 upon pressure capsule 40 changes, a fluid medium within pressure capsule 40 will be compressed, thereby changing the pressure within the capsule. Such changes will be sensed by pressure sensor 42, which will produce a signal related to the magnitude of the force exerted by spring 38. Because this force is proportional to the relative location of the sensor components, and correspondingly, the relative location of the suspension members, the signal generated by the transducer will be proportional to the suspension position. As noted above, the extent of this proportionality is a matter of design choice.

Those skilled in the art will appreciate in view of this disclosure that the medium within capsule 40 may comprise a gas or a liquid. The latter may be preferred in certain cases because of the damping a liquid would provide.

Pressure measuring device 42 may comprise any one of a variety of known analog or digital devices operating according to known principles for the purpose of measuring a fluid pressure and for producing a signal which is proportional to said pressure. Examples of such devices include piezoelectric crystal devices, strain gauge diaphragm devices, variable capacitance devices, or other such devices. A discussion of such sensors is found in *Internal Combustion Engines,* International Textbook Company, 1968, at pgs. 147–153, which is hereby incorporated by reference.

In the embodiment shown in FIG. 4, compression spring 38 bears directly upon a plurality of piezoelectric crystals, 44, which crystals comprise the transducer of FIG. 4. It is well known that such crystals have the ability of translating a force or pressure directly into an electrical signal. Thus, as the suspension of FIG. 2 moves in the jounce and rebound directions, spring 38 will be alternately compressed and allowed to expand, such that plunger 36 and spring 38 will exert pressure on crystals 44, with the result that the crystals will generate a signal proportional to the exerted pressure, and hence, proportional to the suspension position. This signal is transmitted to a microprocessor via leads 45.

Figure 5:
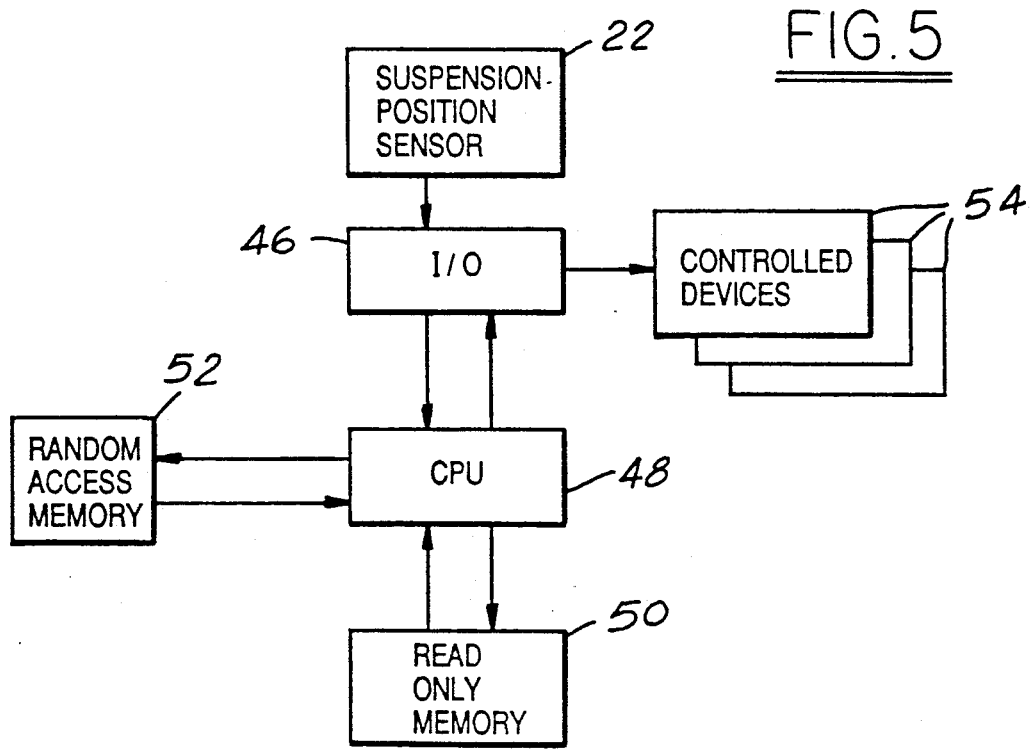
FIG. 5 is a system block diagram in accordance with an embodiment of this invention.

Regardless of the type of transducer employed in a sensor according to the present invention, an electronic processor means may be employed for handling the signal emitted by the transducer within the sensor. If the transducer is thought of as producing a first signal related to the position of the suspension members with respect to one another, the processor means may be thought of as means for taking this first signal and for producing a second signal which is directly proportional to the relative position of the suspension members. FIG. 5 contains an illustration of certain component parts of such a processor, which could include a microprocessor computer configured so that a control program is sequentially read for each unit command from a read-only memory (ROM), 50, which stores preset control programs. Unit commands are executed by a central processing unit (CPU), 48. The processor integrally includes an input-output control circuit (I/O), 46, for exchanging data with external devices and a random access memory (RAM), 52, for temporarily holding data while the data are being processed. Finally, the processor would include a plurality of registers for handling the output information from the sensor.

Turning once again to FIG. 5, the transducer portion of position sensor 22 sends signals to I/O device 46. If the signal from the transducer is in an analog format, the I/O device will digitize the signal and then send the signal to CPU 48. The CPU will enter the digitized signal into a RAM location and compare the sensor signal with a plurality of reference signals located in a lookup table within the ROM. Upon matching the sensor signal with an appropriate reference signal, the CPU will obtain a suspension position signal which may be used in a variety of suspension control algorithms. Those skilled in the art will appreciate in view of this disclosure that a system according to the present invention could be implemented with a non-linear compression spring, 38, or other types of non-linear compressible materials by using a lookup table within the ROM which is adjusted to accommodate the non-linearity. Such a non-linear device may be useful for implementing a ride height adjustment system in which the vehicle is operated at a lower ride height (i.e., aerodynamic position) for speeds exceeding a given threshold. If such is the case, a non-linear compressive element could be used within the sensor, for example, to give more rapid force buildup as the lower ride height limit of the aerodynamic position is reached.

The position sensor and processor may be employed for calculating the velocity of the suspension by taking a time derivative of successive position values. The sensor and processor may also be employed as an operator and sensor for controlling the ride height of a vehicle, as follows. It is important to note in this regard that a sensor according to the present invention should be considered as a high resolution height sensor because the total suspension travel from full jounce to full rebound may be divided very finely by this sensor. This flows from the fact that the output of the present sensor is continuous, rather than discontinuous, as are the outputs of many prior art sensors. Although certain prior art sensors such as the linear variable differential transformer (LVDT) have continuous outputs, the present sensor is much simplified and more robust, as compared to other such sensors.

The processor of a system for controlling vehicle ride height according to this invention will receive a train of ride height signals from the I/O device. These signals will form a basis for calculating a weighted average ride height. The weighted average may comprise an arithmetic average of a predetermined number of sampled ride heights. Alternatively, the weighted average may be represented by a value established in a summing register which includes a predetermined number of ride height samples. Because a system according to this invention will use actual height measurements, rather than the less accurate "high" or "low" signals utilized in prior art ride height control systems, the average of a number of samples may be described as "weighted". Once the weighted average has been determined, the processor may compare the average to a plurality of different reference ride height values contained in the RAM. Upon making a match as a result of the comparison, the CPU will read a ride height value from the RAM and use this value for deciding whether to adjust the ride height. Alternatively, the RAM may be structured so that a ride height adjustment signal is read for each weighted average ride height and desired controlled ride height. For example, if the weighted ride height is two units over the desired ride height the lookup table within the ROM may be structured to give a minus-two adjustment signal in order to bring the ride height down to the desired level. With the system shown in FIG. 1, this could be done by venting air from one or more of the ride height adjusters to achieve the desired ride height.

Those skilled in the art will appreciate in view of this disclosure that a sensor could be constructed according to this invention with other types of attachment hardware and other outer housing configurations. Similarly, other types of pressure sensing devices and processor algorithms could be employed with a sensor according to this invention, depending upon the data needs of the particular suspension control system being serviced by the sensor. Finally, those skilled in the art will further appreciate in view of this disclosure that the air spring of an air suspension system could itself be employed as a transducer, with a pressure senor mounted so as to measure changes in the pressure within the springs's air chamber. These and all other variations and modifications of the present invention are possible without departing from its spirit and scope as defined by the appended Claims.

I claim:
1. A sensor for determining the operational position of an automotive suspension including two suspension members relatively movable with respect to one another, comprising:
   a first sensor component movable with respect to a second sensor component; and
   means for attaching said first sensor component to one of said relatively movable suspension members and means for attaching said second sensor component to the other of said relatively movable suspension members such that said first and second sensor components will be caused to move with respect to one another when said suspension members move with respect to one another;
   said first sensor component comprising a housing with a force transducer means situated therein, with said transducer means being adapted to generate a signal proportional to a force imposed upon said transducer means;
   said second sensor component comprising a plunger telescopically received in said housing and bearing upon an elastically deformable member in contact with said force transducer means, whereby said plunger and said elastically deformable member will exert a force upon said transducer means which is proportional to the position of the suspension members with respect to one other.
2. A sensor according to claim 1 wherein said elastically deformable member comprises a compression spring.
3. A sensing system according to claim 1 wherein said transducer means comprises a piezoelectric device.
4. An adjustable ride height suspension unit operator and sensor for controlling the ride height of an automotive vehicle, comprising:

a high resolution height sensor for providing a train of ride height signals related to the ride height of said vehicle;

a processor comprising:

means for receiving said ride height signals and for calculating a weighted average of said signals;

means for comparing said weighted average to a plurality of values corresponding to a plurality of different reference ride heights and for generating an adjustment signal having a value, which is dependent upon the results of said comparison; and adjustment means, responsive to said adjustment signal, for changing the ride height of said automotive vehicle by adjusting an adjustable suspension unit.

5. An adjustable ride height suspension unit operator and sensor according to claim 4 wherein said high resolution height sensor comprises a force-operated height sensor.

6. An adjustable ride height suspension unit operator and sensor according to claim 4 wherein said processor means for comparing said weighted average to a plurality of values corresponding to a plurality of different reference ride heights and for generating an adjustment signal having a value which is dependent upon the results of said comparison comprises a readable addressable memory containing a plurality of values of said weighted average and corresponding values of said adjustment signal.

7. An adjustable ride height suspension unit operator and sensor according to claim 4 wherein said processor means for receiving said ride height signals and for calculating a weighted average of said signals comprises a summing register for receiving said ride height signals from a signal conditioner operatively associated with said sensor.

8. A sensor according to claim 1 wherein said transducer means comprises a pressure vessel operatively connected with said elastically deformable member such that the pressure within said vessel is proportional to the magnitude of the force generated when said components are moved with respect to one another, with said transducer means further comprising means for measuring said pressure and for producing a signal proportional to said pressure.

* * * * *